| United States Patent [19] | [11] Patent Number: 4,511,712 |
| Florence | [45] Date of Patent: Apr. 16, 1985 |

[54] METHOD FOR ISOLATING IONOMERS IN THE SALT FORM

[75] Inventor: Robert A. Florence, Scotia, N.Y.

[73] Assignee: General Electric Company, Schenectady, N.Y.

[21] Appl. No.: 581,756

[22] Filed: Feb. 21, 1984

[51] Int. Cl.$^3$ .................. C08F 6/00; C08G 00/00; C08J 3/00

[52] U.S. Cl. .................. 528/488; 528/490; 528/492

[58] Field of Search .................. 528/488, 490, 492

[56] References Cited

U.S. PATENT DOCUMENTS 3,870,841  3/1975  Makowski et al. .................. 524/132
4,065,522  12/1977  Myers et al.

*Primary Examiner*—Joseph L. Schofer
*Assistant Examiner*—S. Babajko
*Attorney, Agent, or Firm*—William H. Pittman; James C. Davis, Jr.; James Magee, Jr.

[57] ABSTRACT

Ionomers such as sulfonated polystyrenes are isolated from solutions in organic solvents (e.g., methylene chloride) in the salt form (usually the ammonium or amine salt form) by blending the ionomer solution with a solution of a salt in an organic liquid which is substantially a non-solvent for said ionomer. The salt is one in which the counterion is identical to that of the ionomer or below it in the ion affinity sequence, and is preferably an ammonium salt, especially ammonium chloride. The preferred organic liquid is methanol. The method enables recovery of the precipitated ionomer in finely divided, granular form rather than in colloidal condition.

20 Claims, No Drawings

METHOD FOR ISOLATING IONOMERS IN THE SALT FORM

This invention relates to ionomers and their isolation. In a more particular sense, it relates to the isolation of ionomers in the salt form.

Ionomers, i.e., polymers with ionic substituents, are known in the art and are of increasing interest in various aspects of polymer technology. The ionic substituent groups thereon may be anionic such as sulfonate or carboxylate groups, or cationic such as alkylammonium or quaternary ammonium. They are useful in the free acid or base form and also in the salt form, typically obtained by neutralization of the free acid or base form. For cationic ionomers, typical neutralizing reagents are acids, such as hydrochloric and sulfuric acids; for anionic ionomers, bases, such as metal oxides or hydroxides, ammonia and amines may be used. Neutralized anionic ionomers, including those in the ammonium and amine salt form, and various uses therefor are disclosed in a number of patents including U.S. Pat. Nos. 3,642,728 and 3,870,841.

It is frequently convenient to prepare ionomers in the salt form by combining the neutralizing reagent with a solution of the free acid or base form of the polymer in an organic solvent, and then to precipitate the salt by blending said solution with an organic liquid which is a non-solvent therefor. However, the use in this manner of organic liquids typically characterized as non-solvents has sometimes been found to swell the polymer, resulting in its recovery in more or less colloidal condition and often as a gel. Separation of a polymer in this condition is difficult, as are processing operations and the like performed thereon such as blending and extrusion.

A principal object of the present invention, therefore, is to provide an improved method for isolation of ionomers in the salt form.

A further object is to provide a method which avoids recovery of said ionomers as gels or in colloidal condition.

Still another object is to recover said ionomers as finely divided, granular powders which may be easily separated and processed.

Other objects will in part be obvious and will in part appear hereinafter.

In its broadest sense, the present invention is a method of isolating ionomers in the salt form from a solution of at least one such ionomer in an organic solvent which comprises precipitating said ionomer by blending said solution with a solution, in an organic liquid which is substantially a non-solvent for said ionomer, of at least one salt in which the counterion is identical to that of said ionomer or below it in the ion affinity sequence, and removing the precipitated ionomer.

The method of this invention is of general applicability to ionomers and especially to those containing anionic substituents. Such substituents, in their free acid form, usually have $pK_a$ values up to about 5.0. Suitable ionomers generally comprise those containing carboxylic and sulfonic acid substituents. It is particularly effective with polymers having relatively low solubility in polar solvents such as water or methanol. Such polymers typically contain up to about 15% and preferably up to about 5% by weight of ionic substituents.

In terms of structure, a wide variety of ionomers are useful in the method of this invention. Most of them are derived from substantially aromatic base polymers; that is, base polymers in which a substantial proportion of the mers (i.e., repeating monomer-derived units) contain an aromatic moiety, such as a benzene or naphthalene group. In general, at least about 50% by number of the mers, preferably at least about 90% and frequently 100%, contain an aromatic moiety. They may be addition polymers such as styrene homopolymers and copolymers (which are preferred, the homopolymers being particularly preferred), or condensation polymers such as aromatic polycarbonates, polyphenylene oxides and saturated polyesters including polyethylene terephthalate and polybutylene terephthalate. However, it is also within the scope of the invention to use aliphatic base polymers. The mers in such aliphatic polymers may be derived from one or more of monoolefinic compounds such as ethylene, propylene and isobutene; conjugated dienes such as butadiene, isoprene and chloroprene; and non-conjugated dienes such as 1,4-hexadiene, 1,4-cyclohexadiene and 5-methylene-2-norbornene. Particularly preferred aliphatic base polymers are the carbon atom backbone elastomers illustrated by natural rubber, synthetic diene rubbers, butyl rubbers, polyisobutene rubbers, ethylene-propylene rubbers, ethylene-propylene-diene rubbers wherein the diene is non-conjugated (EPDM rubbers) and chloroprene rubbers.

Ionomers in which the substituents are cationic are illustrated by addition copolymers of the above-listed monomers (e.g., styrene) and vinylpyridine. Among the preferred ionomers containing anionic substituents are those with carboxy groups, illustrated by addition copolymers of acrylic and methacrylic acid with the above-listed monomers. Sulfonate groups are most preferred; polymers containing them are illustrated by the sulfonation products of the above-described polymers, as well as by addition copolymers of the above-listed monomers with sulfonate group-containing monomers such as 2-acrylamido-2-methylpropanesulfonic acid, sulfoethyl methacrylate and styrenesulfonic acid.

The number average molecular weight of the ionomer is most often at least about 10,000. There is no upper molecular weight limit; polymers with molecular weights in the millions may be used, but the value is usually not above 2,000,000. Most often, it is between about 40,000 and about 500,000.

While the present invention is generally applicable to the previously described types of ionomers, it is particularly useful with those which contain anionic substituents and which are being isolated as their ammonium or amine salts. Such polymers are frequently identified hereinafter as being "in the ammonium or amine salt form". The term "amine salt" includes salts of aliphatic amines such as trimethylamine, triethylamine, 2-propylamine, 1-butylamine and di-1-butylamine; alicyclic amines such as cyclopentylamine and cyclohexylamine; aralkyl amines such as benzylamine; and heterocyclic amines such as pyrrole, piperidine, morpholine and pyridine.

The details of preparation of the salt form of the ionomer are not critical from the standpoint of this invention. Most often, as previously mentioned, the polymer in the acid form is dissolved in an organic solvent, which is then contacted with ammonia or the amine either undiluted or as a solution in water or in another suitable liquid. The essential feature, from the standpoint of this invention, is that the ammonium or amine salt of the polymer is initially obtained in solution, hereinafter sometimes referred to as the "polymer solution", in an organic solvent. The identity of the solvent and the concentration of the polymer solution therein are also not critical. Suitable solvents include aromatic hydrocarbons such as benzene, toluene and xylene; chlorinated aromatic hydrocarbons such as chlorobenzene and o-dichlorobenzene; chlorinated aliphatic hydrocarbons such as methylene chloride, chloroform and ethylene chloride; ethers such as ethylene glycol dimethyl ether; and other substituted aromatic hydrocarbons such as nitrobenzene. Particularly preferred are the chlorinated aliphatic hydrocarbons, especially methylene chloride. Most often, the concentration of the polymer solution is about 10-40% by weight.

The method of this invention includes the essential step of blending the polymer solution with a solution of at least one salt as defined herein. Said solution is sometimes referred to hereinafter as the "salt solution". The identity of the salt therein depends to some extent on the counterion in the ionomer. Most often an identical ion is present in the salt, but an ion below said counterion in the ion affinity sequence may also be used, salts containing such ions being incapable of undergoing a metathesis reaction with the polymer. Illustrative ions which are suitably low in said sequence are the lithium, sodium and potassium cations and the bicarbonate, acetate and fluoride anions. The identity of the other ion in the salt is not critical; alkali metal, alkaline earth metal, ammonium and amine-derived cations and such anions as chloride, sulfate, nitrate, acetate and phosphate are suitable.

When the ionomer contains anionic substituents, the salt may be an ammonium, amine, lithium, sodium or potassium salt. If it is an amine salt, the amine corresponds to the amine cation of the polymer. The ammonium or corresponding amine salts are preferred. For reasons of availability and relatively low cost, ammonium chloride and the amine hydrochlorides are especially preferred, with the former generally being most preferred.

The organic liquid of the salt solution may also be widely varied, provided that it is substantially a non-solvent for the polymer; that is, that the solubility of the polymer therein is slight. Illustrative organic liquids are lower alkanols (preferably containing 1-4 carbon atoms) such as methanol, ethanol and 2-propanol and aprotic polar solvents such as dimethyl sulfoxide. The alkanols, especially methanol, are most often used.

The concentration of the salt solution, although not critical, is usually fairly low owing to the limited solubility of most salts in the organic liquids employed. For example, the solubility of ammonium chloride in ethanol at ambient temperatures is only about 0.6 gram per 100 ml. It is generally convenient to employ a salt solution having a salt concentration up to about 3 grams and most often no more than about 1 gram per 100 ml. Most often, said solution contains at least about 25% and preferably up to about 75% of the solubility limit of the salt at room temperature.

The salt solution and polymer solution may be blended by any method and in any order which is appropriate. It is frequently convenient to add the polymer solution to the salt solution, often with vigorous agitation as by stirring. Blending is normally effected at a temperature within the range of about 15°-40° C. and most often at room temperature. In order to insure complete precipitation of the ionomer, it is normal to employ a weight ratio of salt solution to polymer solution greater than 1:1, most often from about 2:1 to about 15:1.

Precipitation of the ionomer normally occurs immediately upon blending said solutions or very shortly thereafter. The precipitated polymer is then removed by suitable conventional methods such as filtration, centrifugation, or decantation of liquid.

The invention is illustrated by the following examples. All parts are by weight unless otherwise indicated. Examples 1 and 3 illustrate a method of the invention; Examples 2 and 4 are provided for comparison purposes.

EXAMPLE 1

To a solution in 2450 ml. of methylene chloride of a sulfonated polystyrene having a number average molecular weight of about 90,000 and containing 1.4% sulfur (about 3.5% sulfonic acid groups), prepared by the reaction of acetyl sulfate with a methylene chloride solution of 520 grams of polystyrene, was added, with stirring, 85.5 grams of a 30% aqueous ammonium hydroxide solution. The resulting liquid comprised the desired solution of the ionomer ammonium salt.

A saturated solution of ammonium chloride in methanol was prepared by stirring one liter of methanol with excess ammonium chloride at room temperature. The saturated solution was filtered and diluted with an additional liter of methanol. To the resulting salt solution was added, with vigorous agitation, 500 ml. of the polymer solution. The desired ammonium salt of the sulfonated polystyrene precipitated as a fine granular powder, easily removable by filtration.

EXAMPLE 2

The procedure of Example 1 was repeated, except that the methanolic ammonium chloride solution was replaced by methanol. The polymer was obtained in gelatinous form, highly swelled with methanol and incapable of effective filtration.

EXAMPLE 3

To a solution in 500 ml. of methylene chloride of 100 grams of a polystyrene-acrylic acid copolymer containing 5% acrylic acid units (about 3.1% carboxylic acid groups) was added, with stirring, 10 ml. of a 30% aqueous ammonium hydroxide solution. The reaction mixture was stirred for one hour at room temperature to insure complete conversion to the ionomer ammonium salt.

A saturated solution of ammonium chloride in 2 liters of methanol was prepared, and 200 ml. of the polymer solution was added thereto with vigorous agitation. The polymer precipitated as a granular white powder, easily filterable through standard coarse filter paper.

EXAMPLE 4

The procedure of Example 3 was repeated, except that the methanolic ammonium chloride solution was replaced by methanol. The precipitated polymer was extremely fine and gel-like, and could not be vacuum filtered through standard coarse filter paper.

What is claimed is:

1. A method of isolating ionomers in the salt form from a solution of at least one such ionomer in an organic solvent,
   said ionomer comprising a substantially aromatic polymer or a carbon atom backbone elastomer and having ionic substituents selected from the group consisting of sulfonate, carboxylate, alkylammonium and quaternary ammonium groups, which comprises precipitating said ionomer by blending said solution with a solution, in an organic liquid which is substantially a non-solvent for said ionomer, of at least one salt in which the counterion is identical to that of said ionomer or below it in the ion affinity sequence, and removing the precipitated ionomer.

2. A method according to claim 1 wherein the ionomer contains anionic substituents and is isolated in the ammonium or amine salt form, and wherein the counterion in the salt is ammonium, amine corresponding to the amine cation of said ionomer, lithium, sodium or potassium.

3. A method according to claim 2 wherein the ionomer has a $pK_a$ value in the free acid form up to about 5.0.

4. A method according to claim 3 wherein the ionomer is a substantially aromatic polymer, and the ionic substituents thereon are sulfonate groups.

5. A method according to claim 4 wherein the ionomer is isolated in the ammonium salt form.

6. A method according to claim 5 wherein the organic solvent for the polymer solution is methylene chloride.

7. A method according to claim 6 wherein the salt is an ammonium salt.

8. A method according to claim 7 wherein the ionomer is a sulfonated polystyrene.

9. A method according to claim 8 wherein the organic liquid in the salt solution is methanol and the salt is ammonium chloride.

10. A method according to claim 9 wherein the salt concentration in the salt solution is no more than about 1 gram per 100 ml.

11. A method according to claim 9 wherein the polymer contains up to about 5% by weight of ionic substituents.

12. A method according to claim 2 wherein the polymer solution is added to the salt solution, the weight ratio of salt solution to polymer solution being from about 2:1 to about 15:1.

13. A method according to claim 12 wherein the ionomer has a $pK_a$ value in the free acid form up to about 5.0.

14. A method according to claim 13 wherein the ionomer is a substantially aromatic polymer, the ionic substituents thereon are sulfonate groups, and the polymer is isolated in the ammonium salt form.

15. A method according to claim 14 wherein the organic solvent for the polymer solution is methylene chloride.

16. A method according to claim 15 wherein the salt is an ammonium salt.

17. A method according to claim 16 wherein the ionomer is a sulfonated polystyrene.

18. A method according to claim 17 wherein the organic liquid in the salt solution is methanol and the salt is ammonium chloride.

19. A method according to claim 18 wherein the salt concentration in the salt solution is no more than about 1 gram per 100 ml.

20. A method according to claim 18 wherein the polymer contains up to about 5% by weight of ionic substituents.

* * * * *